United States Patent

[11] 3,559,970

[72] Inventors: Ichizo Hamabe;
 Motoaki Hirao, Kobe-shi; Gunji
 Kagamiuchi, Akashi-shi, Japan
[21] Appl. No.: 726,502
[22] Filed: May 3, 1968
[45] Patented: Feb. 2, 1971
[73] Assignee: Kawasaki Jukogyo Kabushiki Kaisha
 Ikuta-Ku, Kobe, Japan
[32] Priority: Dec. 22, 1967
[33] Japan
[31] 42/82267

[54] APPARATUS FOR CONTROLLING THE GAS
PRESSURE FROM A CONVERTER
6 Claims, 5 Drawing Figs.
[52] U.S. Cl. ...................................................... 266/15,
 55/210, 55/267
[51] Int. Cl. ...................................................... F27d 19/00
[50] Field of Search ........................................... 266/15, 16,
 35, 17, 31; 236/15C; 110/8A; 98/115; 263/(No
 Search); 75/60; 55/20, 21, 210, 267, 268, 269

[56] References Cited
UNITED STATES PATENTS
3,154,406  10/1964  Allard .......................... 266/31X
3,332,676  7/1967  Namy .......................... 266/31X
3,333,839  8/1967  Maehara et al. ............... 266/31X
3,342,472  9/1967  Namy et al. ................... 266/35

Primary Examiner—J. Spencer Overholser
Assistant Examiner—John S. Brown
Attorney—Sughrue, Rothwell, Mion, Zinn and Macpeak ABSTRACT: A system for controlling the pressure of the gas generated from a converter in noncombustion state and collected in a hood with atmospheric air being excluded from the hood including cooling and dust removing means for the gas before the gas is stored. The pressure of the gas within the hood is detected as one signal factor, said detected signal factor being applied to an adjusting instrument so as to actuate a mechanism in said system for controlling the pressure of the gas by opening and closing a damper located in a duct leading from the hood. The system further includes a mechanism for delaying the time the damper in said duct is opened or closed by applying a signal factor other than said signal factor derived from the pressure of the gas in said hood to said adjusting instrument.

INVENTORS
ICHIZO HAMABE
MOTOAKI HIRAO
GUNJI KAGAMIUCHI

BY Sughrue, Rothwell, Mion, Zinn & Macpeak

ATTORNEYS

P: CHARGING OF SUBSIDIARY RAW MATERIAL

Q: RISING OF GAS PRESSURE AT TAP HOLE

R: RISING OF GAS FLOW RATE AT CONVERTER MOUTH BY CHARGING SUBSIDIARY RAW MATERIAL

S: START OF CONTROL VALVE MOVING

INVENTORS
ICHIZO HAMABE
MOTOAKI HIRAO
GUNJI KAGAMIUCHI

BY Sughrue, Rothwell, Mion, Zinn & Macpeak
ATTORNEYS

APPARATUS FOR CONTROLLING THE GAS PRESSURE FROM A CONVERTER

BACKGROUND OF THE INVENTION

1. Field of the Invention

This invention relates to a system for controlling the pressure of gas generated by a converter.

2. Description of the Prior Art

Apparatus which is adapted to collect and store the CO rich gas which is in a noncombustion state by controlling the pressure of the gas generated from a converter and collected in a collecting hood is well known. In such devices, air is prevented from flowing into the hood so that the CO rich gas can be collected in a gas holder in high concentration after it has been cooled and the dust has been removed. In these prior art devices, the pressure of the gas has been controlled by merely detecting the pressure of the gas within the hood so as to utilize the detected pressure as a signal factor for controlling the pressure of the gas. With such systems, it is impossible to completely collect in the hood the gas generated in the converter. Due to the delay which is inherent in such devices, flame and smoke are released to the environment when the subsidiary raw materials are charged in the converter. Such flame and smoke result in contamination of factory air and problems of public nuisance. Further, the pressure of the gas at the hood cannot be controlled since the temperature of the gas at the mouth of the converter varies depending upon the conditions of the month during the blast refining operation such as those caused by stacking of the slag on the surface of the mouth. These conditions require the set pressure to be varied in accordance with the conditions. Therefore, full automatic control of the pressure of the gas in the hood has been desired.

SUMMARY

The present invention avoids the above mentioned disadvantages in the prior art and provides a system for controlling the pressure of the gas in the hood by applying an additional signal to the adjusting instrument in the conventional control system when or immediately after the subsidiary raw materials are charged in the converter. The delay in actuation of the control system is thereby avoided and the control valve is made quickly responsive to the rapid generation of the gas in the converter.

To achieve the above object, the present invention utilizes a signal such as that obtained from the pressure of the gas flowing out of the tap hole of the converter. This data is obtainable earlier than the signal obtained from the pressure of the gas in the hood. Alternatively, the second signal may be obtained from the charging of the subsidiary raw materials in the converter wherein, for example, the signal of opening the gate at the time of charging the subsidiary materials is taken out and the signal is delayed by means of a timer until the actual reaction commences.

In the present invention, in order to achieve the automation of the setting of the pressure of the gas, the variation in the pressure of the gas in the hood is adjusted by measuring the temperature of the gas in the hood, thereby controlling the pressure of the gas in the hood so as to make the pressure of the gas in the hood correspond to the temperature of the same.

DESCRIPTION OF THE PREFERRED EMBODIMENTS

Figure 1:
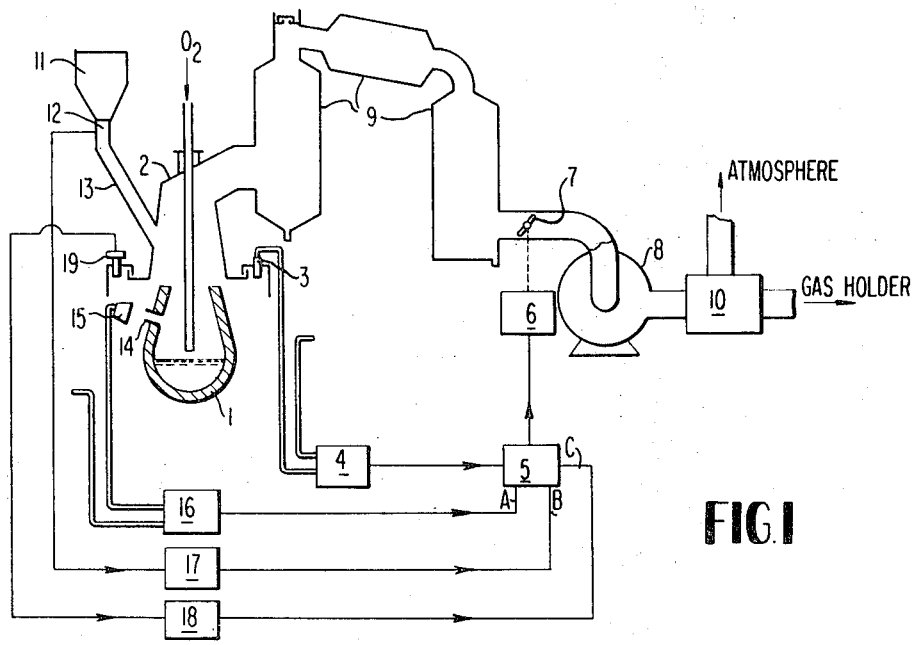
FIG. 1 is a schematic general view partly in cross section of the apparatus embodying the control system in accordance with the present invention.
Figure 3:
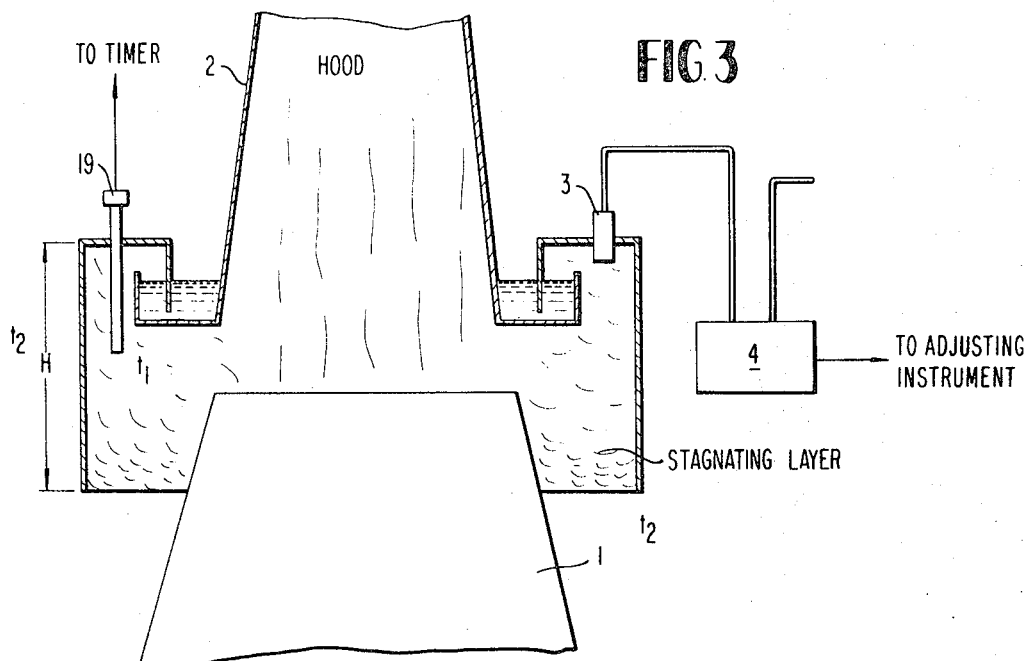
FIG. 3 is a side view partly in cross section showing the state of gas stagnating in the hood.

Referring to FIG. 1, collecting hood 2 is mounted on converter 1. The pressure of the gas in the lower part of hood 2 is regulated by means of differential pressure detector 4, adjusting instrument 5, servodevice 6 and damper 7 located in front of suction blower 8. Suitable detectors, adjusting instruments and servodevices are well known and are shown schematically in the drawings. The difference between the gas pressure at pressure tap 3 and that of the atmosphere is kept at several mm. of water so that a stagnating layer of the gas is produced in the peripheral portion of hood 2 as shown in FIG. 3, thereby permitting only the converter gas to be effectively collected in hood 2. The collected gas passes through cooling and dust removing device 9 so as to be cleaned, and is fed to switching device 10 through suction blower 8. Switching device 10 is so actuated that it feeds the collected CO gas to a gas holder, not shown, only when the concentration of CO gas is high.

Bunker 11 having gate 12 is connected to hood 2 through chute 13 as shown in FIG. 1. When subsidiary raw materials in bunker 11 are charged in converter 1 through chute 13 and hood 2 by opening gate 12, the raw materials react in converter 1 and, a short time after the charge of the raw material, a large quantity of gas is generated from converter 1. It can be seen that the gas at first flows out of tap hole 14 of converter 1. Thereafter, the gas begins to flow out of the peripheral portion of hood 2.

In the first process in accordance with the present invention, the pressure of the gas at pressure pickup 15 at the tap hole 14 of converter 1 is led to differential pressure transmitter 16 so as to create differential pressure output signal A between it and the atmospheric pressure.

This signal A is led to adjusting instrument 5 which forcibly opens damper 7 so that the blasting of the gas out of the mouth of converter 1 is positively prevented. That is, the detected signal at differential pressure transmitter 16 is transformed into electric current so that output signal A is produced which is applied to adjusting instrument 5 thereby causing the set value of the pressure given to adjusting instrument 5 to be lowered. Therefore, a difference in pressure between the pressure of the gas actually detected in differential pressure transmitter 4 and said set value of the pressure actuating adjusting instrument 5 caused adjusting instrument 5 to operate servodevice 6 and open damper 7.

Figure 2:
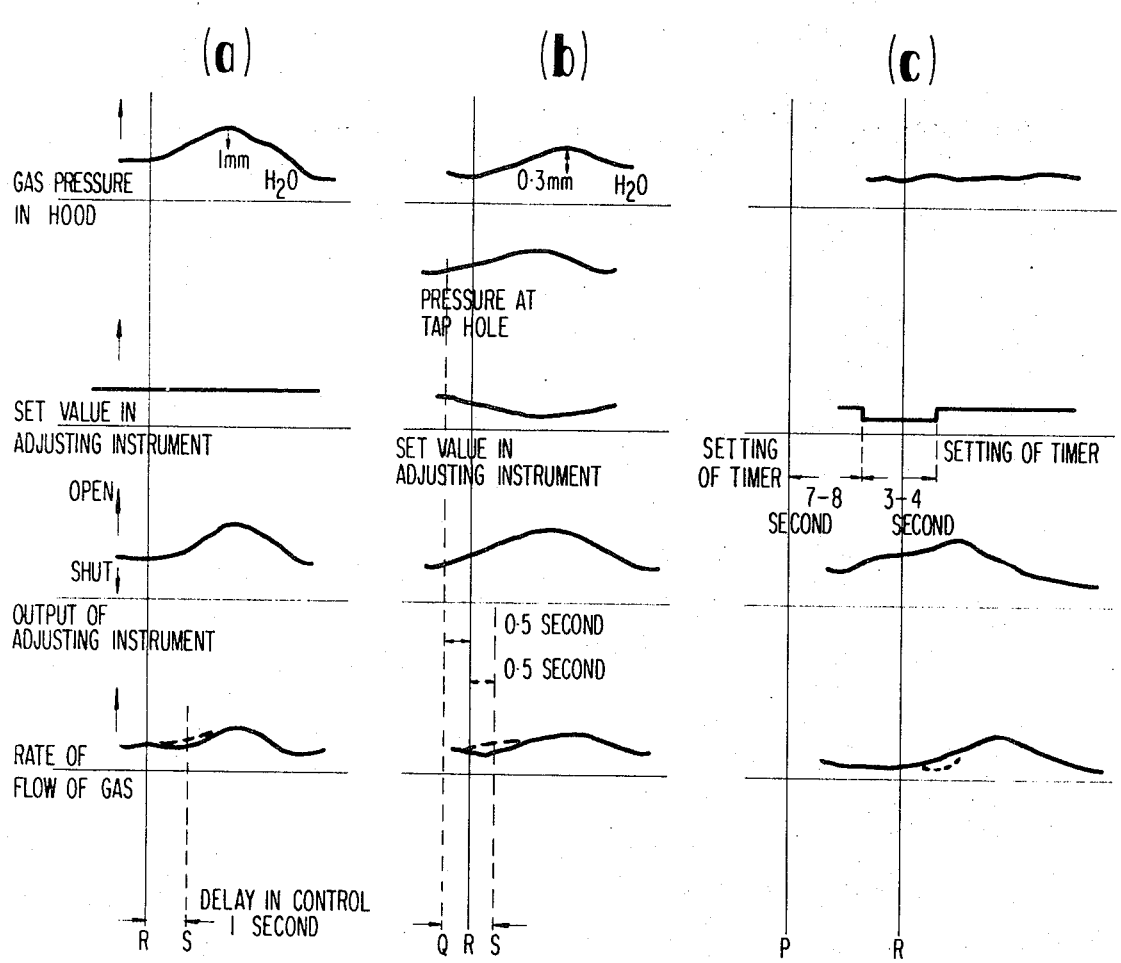
FIG. 2a is a diagram showing the manner in which the control is effected by the conventional control system.
FIG. 2b is a diagram showing the manner in which the control is effected in accordance with the present invention.
FIG. 2c is a diagram showing the manner in which the signal of opening the gate at the time of charging the subsidiary raw materials is utilized.

An example of the first process in accordance with the present invention is shown in FIG. 2b. FIG. 2a shows an example of the prior art in which the set value of pressure of the gas given to adjusting instrument 5 is kept constant. It will be seen that, when the gas is generated quickly, the blasting of the gas out of the mouth of converter 1 shown by the hatched area is effectively reduced in the case of FIG. 2b in comparison with the case shown in FIG. 2a.

The second process in accordance with the present invention is as follows. When the subsidiary materials are charged in chute 13, a signal indicating the opening of gate 12 at chute 13 is detected and this signal is lead to timer 17. Timer 17 is so set and actuated that a signal B indicating respective reaction time period depending upon the kind of the subsidiary materials loaded in chute 13, for example, 7—8 seconds after the charge of the materials in case of calcium oxide, is generated in timer 17 which is applied to adjusting instrument 5, thereby lowering the set value of gas pressure given thereto so that damper 7 is forcibly opened for 3—4 seconds. An example of the second process in accordance with the present invention is shown in FIG. 2c. As shown in FIG. 2c, since damper 7 is forcibly opened for a suitable time period, the blasting of the gas out of the mouth of converter 1 is completely prevented, and, further, suction of excess air is positively prevented by suitably adjusting the degree of opening, i.e., throttling of damper 7.

The third process in accordance with the present invention is as follows. The minor variation in the gas pressure within hood 2 which is varied depending upon the temperature of the gas within hood 2 is adjusted by measuring the temperature of the gas in hood 2 thereby permitting the pressure of the gas in hood 2 to be suitably controlled correspondent to the temperature of the gas within hood 2.

As shown in FIG. 3, a stagnating layer of the gas is generated in hood 2 by keeping the pressure of the gas in hood 2 at about several mm. of the column of water so that only a small portion of the gas in hood 2 is in contact with air at the lower part of hood 2 and burns when converter 1 is controlled in noncombustion state. Therefore, the gas in hood 2 is positively prevented from being mixed with air so that only the gas produced in converter 1 can be effectively sucked in hood 2.

One of the reasons why the gas pressure hood 2 is varied is the fact that the variation in buoyancy of the stagnating layer of the gas having height H as shown in FIG. 3 occurs by virtue of the difference between temperature $t_1$ of the gas in the stagnating layer and temperature $t_2$ of the environment around hood 2 as shown in FIG. 3. That is, during the period in which gas pressure is controlled in noncombustion state of CO gas, temperature $t_1$ of the gas in the stagnating layer in hood 2 varies in the range of about 600—1000° C., whereas the atmospheric temperature $t_2$ around hood 2 varies only within the range of about 100—200° C. Therefore, the temperature difference between $t_1$ and $t_2$ amounts to about 500—900° C. And, since the stagnating layer of the gas in hood 2 has height H amounting to about 500 mm. differential pressure of the gas of about 0.2 mm. of a column of water occurs by virtue of the buoyancy of the stagnating layer of the gas. When the detected pressure rises about 0.1 mm. of a column of water, the stagnating layer of the gas will be raised about 250 mm. if the set value of the pressure given to the adjusting instrument is kept constant. Therefore, slag would stick to the mouth of the converter during the slopping period, thereby raising temperature $t_1$ of the gas in the stagnating layer so that the pressure of the gas at intake port 3 of hood 2 will be raised although the pressure of the gas in hood 2 per se does not vary. On the other hand, the temperature of the gas in hood 2 at the end of the blasting refining operation of the converter will be about 400° C. higher than that at the beginning of the blasting refining operation. Therefore, if the operation is continued under the pressure of the gas set at a constant value, excessive air will be introduced into the hood thereby resulting in lowering the concentration of CO gas.

In accordance with the present invention, the temperature of the gas in hood 2 is detected by temperature measuring means 19, and by applying the detected temperature of the gas to electric current transmitter 18, the value of the pressure of the gas to be set in adjusting instrument 5 is controlled by means of the output of transmitter 18 so that the pressure of the gas is kept at a value suitable for temperature $t_1$. That is, when the temperature of the gas in hood 2 rises, the temperature of the gas detected by temperature measuring 19 and applied to electric current transmitter 18 produces output signal C in transmitter 18. Output signal C actuates adjusting instrument 5 so that the value of the pressure set in instrument 5 is raised. Thus, the differential pressure of the gas detected by differential pressure transmitter 4 indicates that the pressure of the gas at pressure tap 3 of hood 2 is lower than the pressure of the gas set in adjusting instrument 5 thereby actuating servodevice 6 so that damper 7 is controlled appropriately. Therefore, the stagnating layer of the gas is kept at an appropriate height between the mouth of the converter and the hood regardless of the temperature of the gas at the mouth.

As described above, in accordance with the present invention, the pressure of the gas at the mouth of the converter or the signal indicating the charge of subsidiary raw materials is applied to the adjusting instrument of the conventional type in which the pressure of the gas flowing out of the converter is detected at the inlet of the collecting hood to thereby open or close the controlling damper provided in the collecting duct in front of the suction blower. Therefore, the damper can be opened prior to the rising of the pressure of the gas in the hood so that the flame of the burning gas is prevented from rapidly flowing out of the mouth of the converter which might occur in the conventional type of the control due to the rapid increase in pressure of the gas in the converter, and, at the same time, since the height of the stagnation layer of the gas in the hood can be controlled appropriately by automatically varying the pressure of the gas to be set in the adjusting instrument, the admission of excess air into the hood can be kept to a minimum, thereby insuring that the dense CO gas is effectively collected in the gas holder so that the risk of generating public harm is positively prevented and a great advantage is obtained in effectively and economically utilizing the collected CO gas.

We claim:

1. In a system for controlling the pressure of gas generated from a converter comprising:
   a. a gas collecting device having a hood for collecting gas discharged from said converter in a noncombustion state;
   b. a duct for drawing gas from said hood;
   c. a damper in said duct for regulating gas flow from said hood;
   d. cooling and filtering means for treating said gas drawn through said duct;
   e. means preventing atmospheric air from entering said hood so that only said gas generated from said converter can be effectively collected in said hood;
   f. means for generating a first signal responsive to the pressure of said gas within said hood; and
   g. means responsive to said first signal for controlling the pressure of said gas in said hood including an adjusting instrument for opening and closing said damper; the improvement comprising: means for generating a second signal responsive to pressure at a tapping hole of said converter, and means for applying said second signal to said adjusting instrument before said first signal to hasten opening and closing of said damper.

2. In a system for controlling the pressure of gas generated from a converter comprising:
   a. a gas collecting device having a hood for collecting gas discharged from said converter in a noncombustion state;
   b. a duct for drawing gas from said hood;
   c. a damper in said duct for regulating gas flow from said hood;
   d. cooling and filtering means for treating said gas drawn through said duct;
   e. means preventing atmospheric air from entering said hood so that only said gas generated from said converter can be effectively collected in said hood;
   f. means for generating a first signal responsive to the pressure of said gas within said hood; and
   g. means responsive to said first signal for controlling the pressure of said gas in said hood including an adjusting instrument for opening and closing said damper; the improvement comprising: means for generating a second signal responsive to charging of the subsidiary raw materials into the converter, and means for applying said signal to said adjusting instrument before said first signal to hasten opening and closing of said damper.

3. In a system for controlling the pressure of gas generated from a converter according to claim 1, the improvement further comprising means for generating a third signal responsive to the temperature of said gas in a stagnating layer of said hood, said third signal being applied to said adjusting instrument.

4. In a system for controlling the pressure of gas generated from a converter according to claim 2, the improvement further comprising means for generating a third signal responsive to the temperature of said gas in a stagnating layer of said hood, said third signal being applied to said adjusting instrument.

5. In a system for controlling the pressure of gas generated from a converter according to claim 1, the improvement comprising means for generating a third signal responsive to charging of subsidiary raw materials into said converter, and means for applying said third signal to said adjusting instrument.

6. The system as claimed in claim 5, further comprising: means for generating a signal responsive to the temperature of said gas in a stagnating layer of said hood and means for applying said temperature responsive signal to said adjusting instrument.